Feb. 28, 1967  W. KRATZSCH, SR  3,306,120
DRIVING UNIT FOR A FRICTION GEAR AND BELT DRIVE
Filed April 3, 1964  7 Sheets-Sheet 1
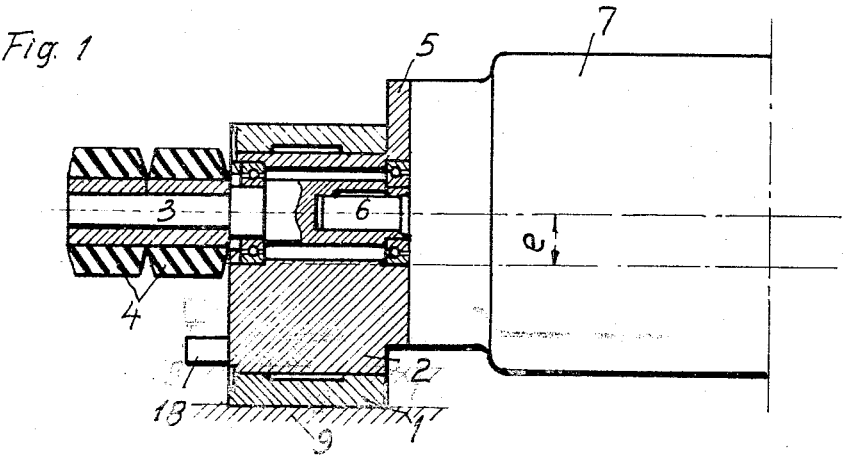
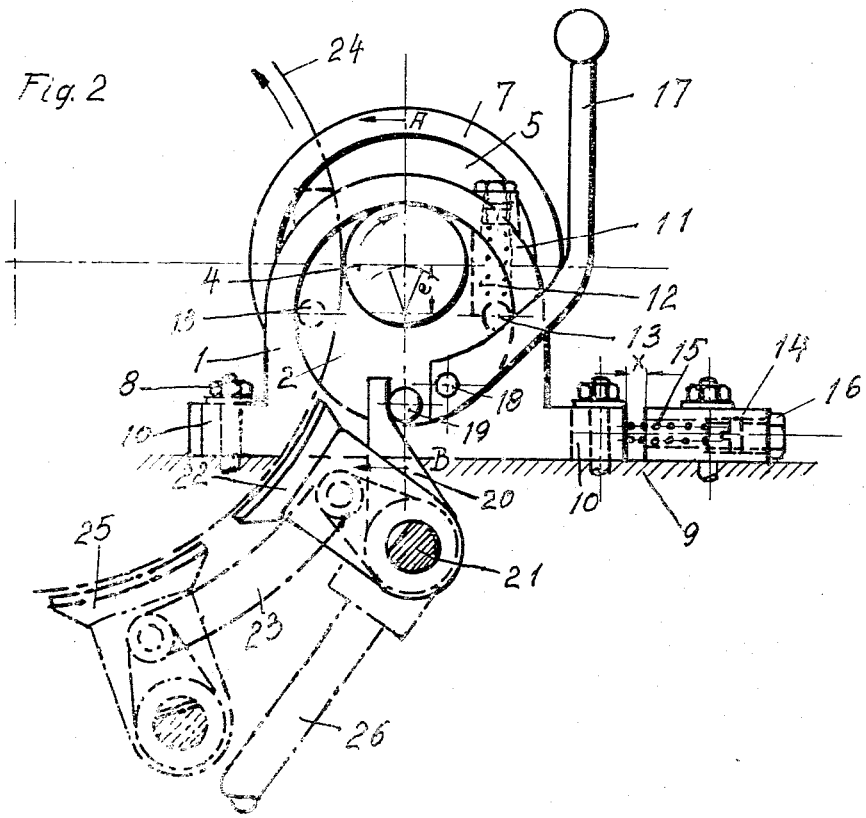
INVENTOR.
WALTER KRATZSCH SR.
BY Jacob L. Kollin
ATTORNEY Feb. 28, 1967  W. KRATZSCH, SR  3,306,120
DRIVING UNIT FOR A FRICTION GEAR AND BELT DRIVE
Filed April 3, 1964  7 Sheets-Sheet 2

INVENTOR.
WALTER KRATZSCH, SR.
BY Jacob L. Kollin,
ATTORNEY

Feb. 28, 1967 W. KRATZSCH, SR 3,306,120
DRIVING UNIT FOR A FRICTION GEAR AND BELT DRIVE
Filed April 3, 1964 7 Sheets-Sheet 3
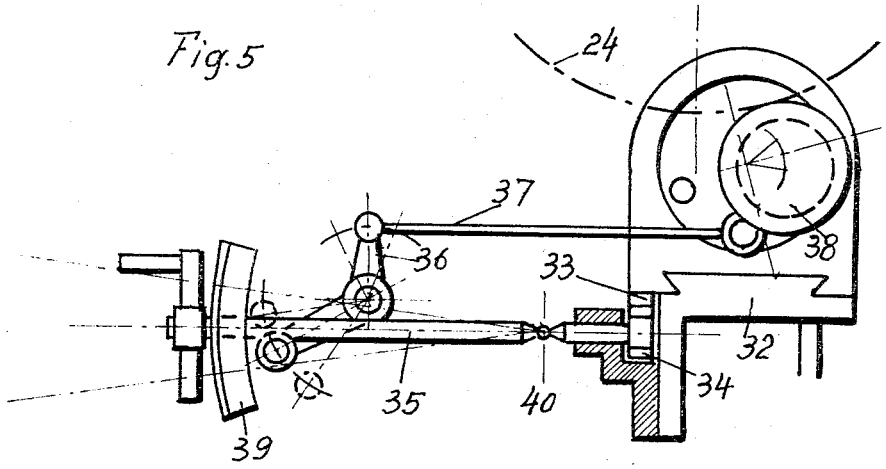
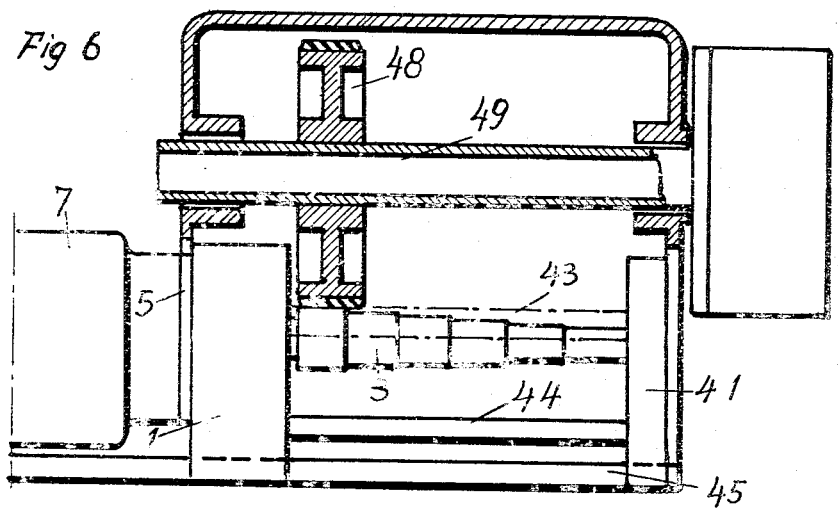
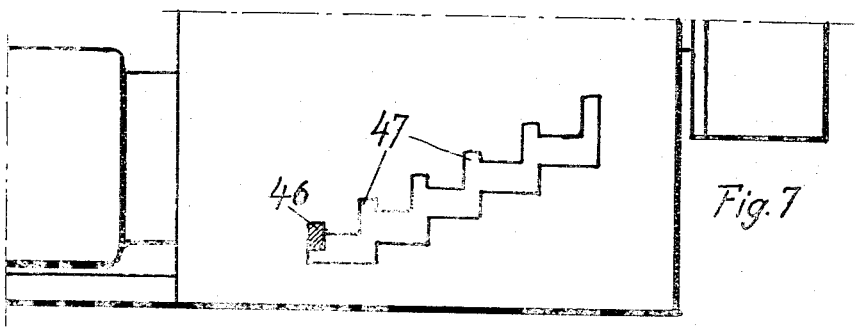
INVENTOR.
WALTER KRATZSCH, Sr.
BY Jacob L. Kallin
ATTORNEY

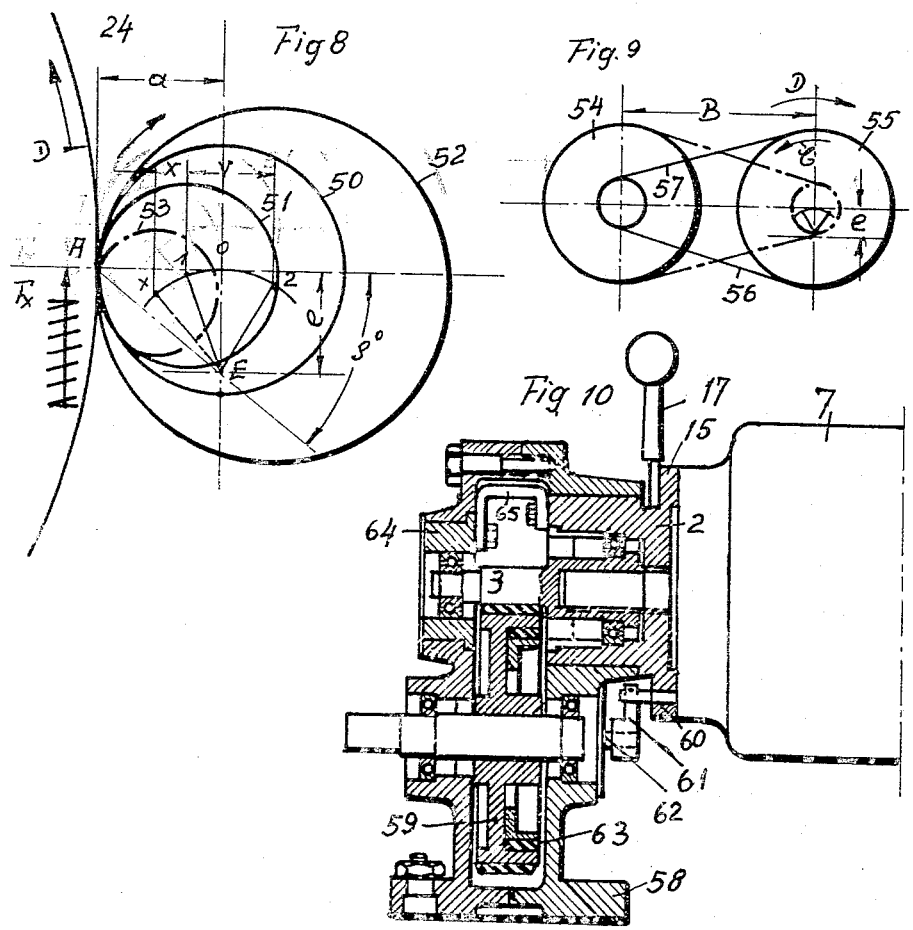

Feb. 28, 1967 W. KRATZSCH, SR 3,306,120
DRIVING UNIT FOR A FRICTION GEAR AND BELT DRIVE
Filed April 3, 1964 7 Sheets-Sheet 5

INVENTOR.
WALTER KRATZSCH, Sr.
BY Jacob L. Kollin
ATTORNEY

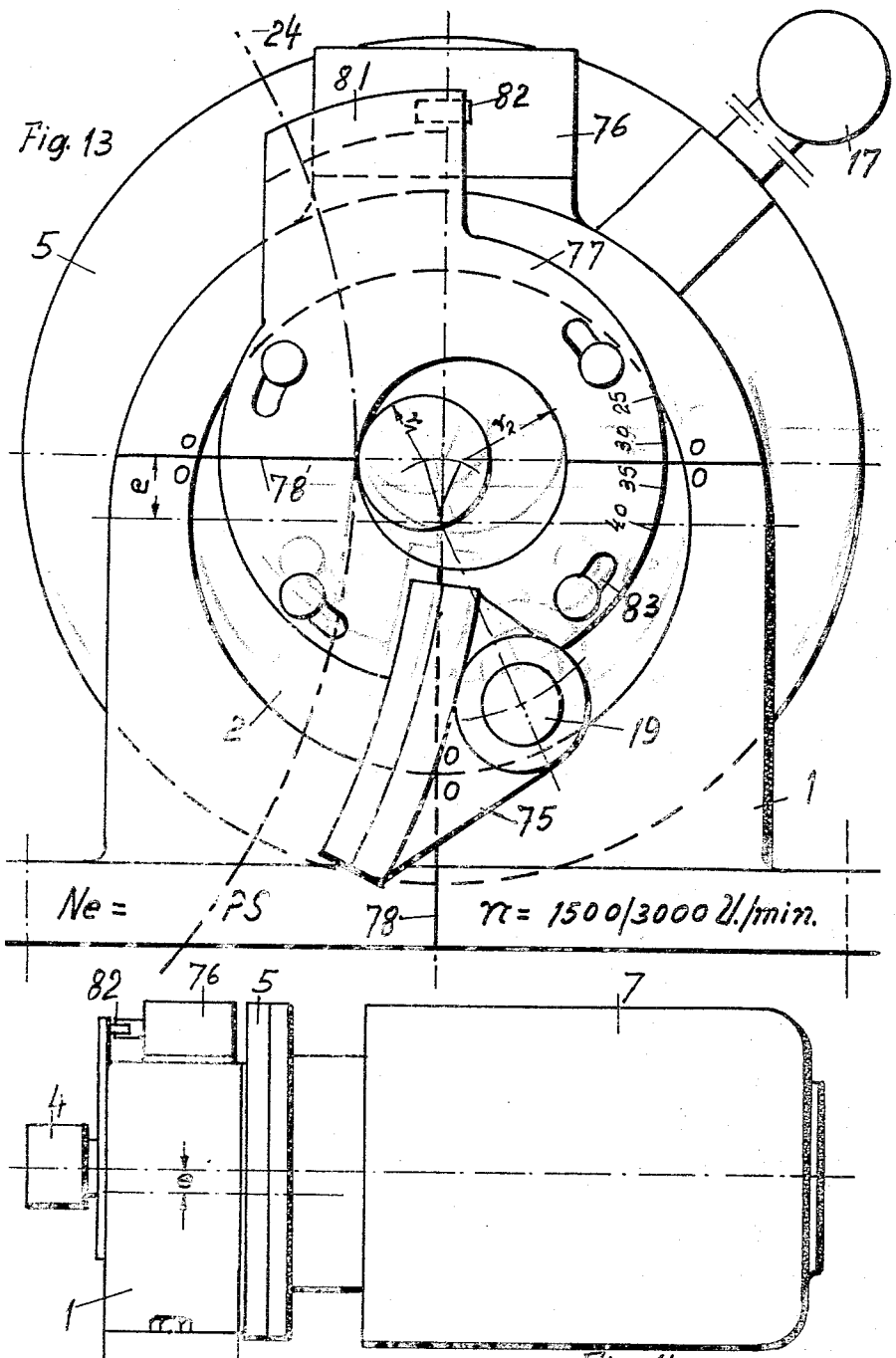

United States Patent Office 3,306,120
Patented Feb. 28, 1967

3,306,120
DRIVING UNIT FOR A FRICTION GEAR
AND BELT DRIVE
Walter Kratzsch, Sr., Wassertorstrasse 36,
Isny, Wurttemberg, Germany
Filed Apr. 3, 1964, Ser. No. 357,058
Claims priority, application Germany, Apr. 18, 1963,
K 49,504
16 Claims. (Cl. 74—207)

The present invention concerns a driving unit for friction wheel and belt drives having an electric motor, the reaction torque of which is used for producing a proportional application pressure, with a fixedly mounted housing in which the driving parts are rotatably mounted, and also having an adjusting lever which successively causes the gearing to be disengaged, the motor to be switched off and the driven component to be slowed down.

Friction wheel drives are known wherein the electric motor is arranged on a rotatably or tiltably mounted rocker. The driving friction pinion is mounted directly on the armature shaft of the electric motor. The weight of the rocker, of the electric motor and also the necessary application pressure to initiate the proportional application pressure is balanced by a spring force below the rocker.

The disadvantages of these drives are that they are not enclosed, but are bulky and of multipartite structure. Assembly and adjustment has to be carried out in situ very carefully mostly by specialists, since otherwise errors readily occur which lead to interferences or even to premature destruction of the friction drive. The electric motor, particularly with large outputs, has to be of a special construction as the armature shaft, the ball bearings and after also the motor housing have to be reinforced in order to withstand the application pressure and the bending stress. Interchanging the driving friction wheel mounted on the armature shaft for one having a smaller of larger diameter to obtain a different transmission ratio is possible only within very close limits of the proportional application pressure is to be maintained and also requires a new adjustment of the electric motor, of the rocker, the spring suspension, the tension rails, the braking and switching lever, which again can only be carried out by specialists. This drive is restricted to one direction of rotation nor can it be used on a different machine, since it is always specially constructed for and adapted to the machine. Neither is it possible to construct this drive as multi-speed change gear, for example, for 3 to 6 speeds, which is required in many cases. Reversal from clockwise to anti-clockwise operation is not possible. The rocker has to be specially fitted on the machine, and the operating levers are mounted in the machine frame. This drive cannot be mounted readily on any other machine.

Belt drives also exist having proportional belt tensioning, wherein a roller bearing is incorporated between the electric motor and the pulley, the pulley is mounted on the armature shaft of the electric motor. The electric motor may be centrically adjusted with certain limits in diverse ways, namely in situ; this can be carried out only by skilled fitters. Normal electric motors may be used for small outputs only. For larger performances special motors have to be used. The transmission ratio may be varied by ±15% at the most within very close limits whilst maintaining the proportional application pressure. Engaging and disengaging and also slowing down of the counter disc is not possible, neither is it possible to change over from clockwise to anti-clockwise operation. Using this belt unit optionally as a friction drive unit is also not possible, because the electric motor and also the interposed roller bearings are unable to absorb the substantially higher pressures and bending stresses. A gear wheel drive is incorporated for obtaining a high transmission ratio.

As the eccentricity possible is very much restricted, this drive cannot be used as a continuous regulating drive. An overload cut-out is not provided.

An object of the invention is to provide a complete driving unit with torque dependent power shunt by means of the reaction torque of the electric motor, which may be used equally well for belt drives and for friction drives whilst using standard electric motors.

The unit should occupy a minimum of space and be capable of mass production, varying from very small outputs up to high outputs for ready attachment to or installation in machines of all kinds, such as machine tools, construction machines, etc., and particularly also for subsequent attachments to existing machines in a factory.

Moreover such a unit must permit considerable transmissions to be obtained without the use of gear wheel drives, the known proportional application pressure on changing the transmission ratio remaining active within wide limits, so that continuous speed regulation may be used without varying the axle spacing by means of the known displacement of the electric motor.

Furthermore, the friction drive unit should be supplied complete and comprise a multi-speed gear or poly speed change gear. Both in the friction and belt drive unit, clockwise and anti-clockwise rotation, coupling and slowing down must be possible.

According to the present invention the driving components are eccentrically mounted in a pivotal cylindrical body, the shaft of the driving friction wheel mounted on the motor journal being doubly mounted in the cylindrical body which is mounted by means of a flange on the opposite side to the motor housing of a standard electric motor, the axle of which is aligned with the axle of the driving friction wheel, the cylindrical body being provided with an adjusting lever for swivelling out the driving components and with two laterally protruding bolts, of which one bolt actuates the motor switch and the other bolt a brake for fixing the driven wheel.

The invention will now be described further, by way of example, with reference to the accompanying drawings, in which:

FIG. 1 is a side view partly in section of a friction wheel driving unit constructed in accordance with the invention;

FIG. 2 is a front view taken from the left hand side of FIG. 1;

FIG. 5 is a front view taken from the left hand side of FIG. 4;

FIGS. 6 to 8 are details showing an alternative embodiment of driving unit for a lathe or spinning lathe;

FIG. 9 is a schematic illustration for a belt drive unit;

FIG. 10 is a side view partly in section of an alternative embodiment of a friction drive unit with internal brake shoe;

FIG. 13 is a front view of an alternative embodiment of a friction drive unit;

FIG. 14 is a plan view of the embodiment shown in FIG. 13; and

Figure 3:
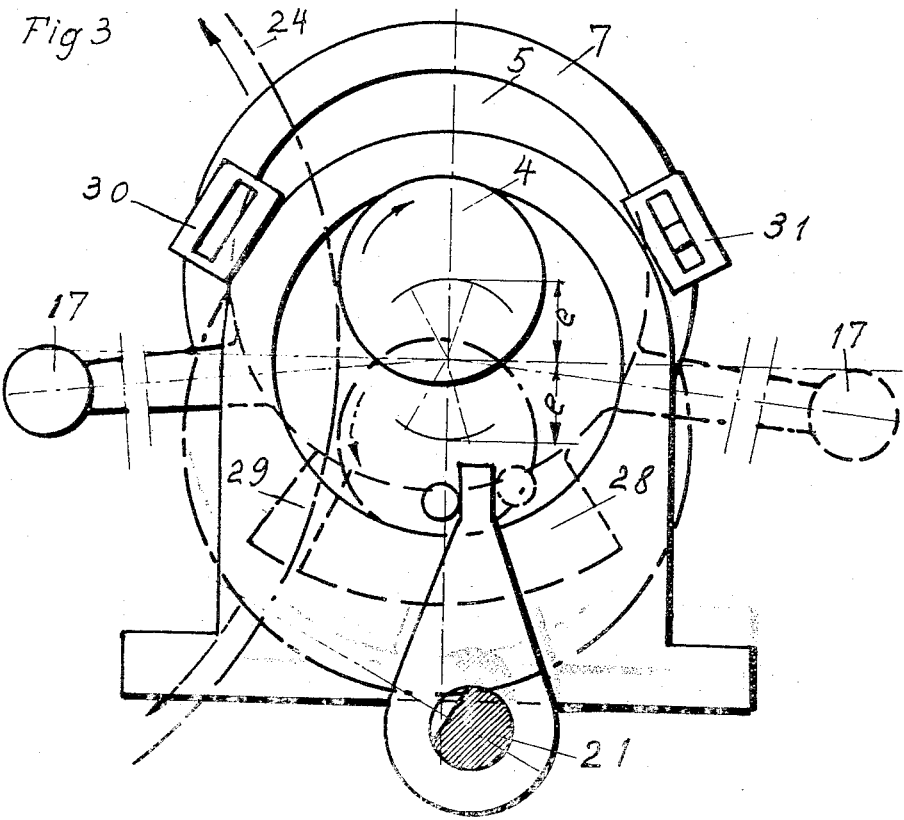
FIG. 3 is an illustration showing the change-over from clockwise to anti-clockwise operation.

In FIGS. 1 and 2 there is illustrated an example of a friction drive unit. A cylindrical body 2 which in accordance with the output to be transmitted is mounted in a housing 1 in sliding, ball, roller or needle bearings. A shaft 3 of a driving friction wheel 4 is mounted in the cylindrical body 2 offset by a distance $e$ from the centre line of the body 2.

A friction wheel 4 is mounted at the end of the shaft 3. On the opposite side, the cylindrical body 2 has a flange 5 adapted to receive a standard electric motor 7 which is aligned with the shaft of the driving friction wheel, and the reaction torque of which causes the proportional application pressure. Driving journals 6 of the electric motor 7 engages in the hollow shaft 3 of the driving friction wheel 4, by means of a keyway. The torque is transmitted from the electric motor 7 to the shaft 3 without bending the same, demonstrating that even with high outputs standard electric motors are useable.

Since in some machines considerable overloads may occur and thereby the friction drive, the belt drive, or the prime mover may be liable to become damaged, an overload cutout is provided. Adjacent to the housing 1, in the direction of the pressure or tension, an abutment 14 is fixedly screwed on to the base 9 at a distance $x$ therefrom. Springs are so incorporated in the abutment 14 that the housing 1, which in this case is slidably retained, is urged thereby into the normal position; with the occurrence of an overload the complete driving unit yields to the spring pressure in the direction of the abutment 14, so that the application pressure or the belt tension slackens. The springs 15 are so installed that the permissible overload can be adjusted, and while the springs can not be readily adjusted from the outside by unauthorized persons, since they are disposed below closure screws 16. To prevent excessive deflection of the friction wheel 4 by the reaction torque of the electric motor in the direction of a large friction wheel 24, a defining stop is provided so that, when an overload occurs, the friction wheels are slackened or disengaged.

As the friction wheel or pulley is not directly mounted on the armature shaft of the electric motor, but mounted on its own shaft 3, the wheel may be of correspondingly strong construction.

To compensate the weight of the eccentrically mounted electric motor 7, compensating springs 11 are so installed in the housing 1 that they exert a pressure in recesses 12 of the cylindrical body 2 via balls 13 against the cylindrical body 2. Thus, if the friction wheel or the pulley is changed and the electric motor assumes a position to the right or to the left, the left or right hand springs compensate the weight. The compensation and additional pressure application however may also be effected optionally, as shown in FIG. 3 by means of a counterweight 28 and an additional weight 29, which are mounted on the flange 5 of the cylindrical body 2.

The cylindrical body 2 may be changed in the same housing 1 for a different cylindrical body of equal diameter, but with a smaller or larger eccentricity $e$ whereby a smaller or larger range is obtained in which the proportional pressure application acts.

In the examples shown in FIGS. 1 and 2 a single adjusting lever 17, also bolts 18 and 19, are mounted on the cylindrical body 2. Actuation of the adjusting lever 17 causes the disengagement and engagement, via the bolts 18 and 19, the slowing down of the counter wheel 24 and switching off and on of the electric motor. In place of the adjusting lever 17 the cylindrical body 2 may also be actuated by means of a cable or via a brake shaft 21, a lever 20 and rod 26, also optionally by means of a rotatable shaft with spur gear, depending upon local conditions. For more effective slowing down it is also possible to actuate two brake shoes 22 and 25 on the counter wheel 24 and connected via a connecting rod 23, as shown in broken lines in the drawings.

Changing over from clockwise to anti-clockwise rotation is obtained by shifting the adjusting lever 17 (FIG. 3) and twisting the cylindrical body 2 through about 180°. Over the changing path the electric motor is switched off by a switch 30, the motor switched on in the other direction of rotation by means of a switch 31 and the engagement effected. In this new position of the cylindrical body 2 in turn a wide range of proportional pressure application for the friction drive and for the belt drive is ensured. In motors which require shutting down before changing over a brake may be actuated in the centre of the change-over arc by means of the adjusting lever 17.

Figure 4:
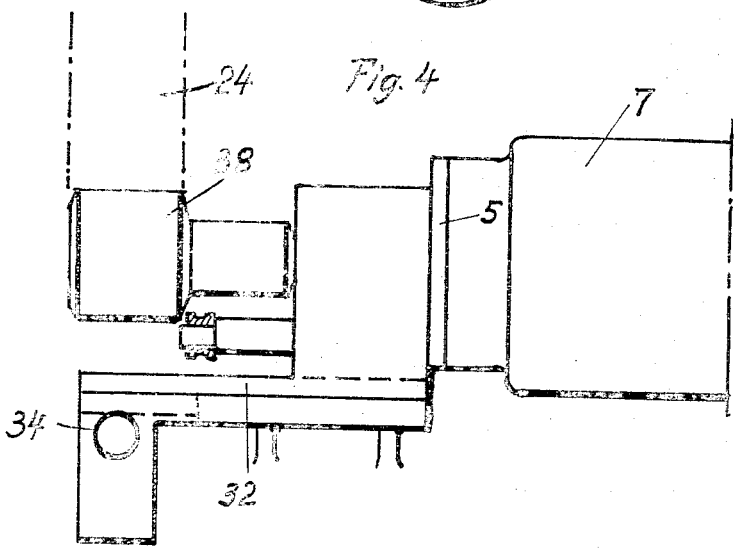
FIG. 4 is a side view of a two speed friction drive unit.

FIGS. 4 and 5 show an example for a two speed driving unit for friction gear drives, the complete unit being mounted on a carriage 32 and disengaged by means of a racked bar 33 and gear wheel 34 via a lever 35, which is guided in a segment 39 and ball joint 40, a bell-crank lever 36 and a cable pull 37. In this case the counter wheel 24 is slowed down, the complete driving unit displaced and a stepped pulley 38 engaged in second gear. In the case of the driving unit for belt drives the construction is the same. The belt is placed only on the second gear, the length of belt remains the same and the proportional application pressure acts in both gears.

FIGS. 6 and 7 show an example of a lathe or spinning lathe comprising six gears and owing to the length of the friction gear shaft 3, a second housing 41 having a second cylindrical body. The two cylindrical bodies are rigidly connected by means of a connecting rod 43, so that they execute identical movements. The two housings 1 and 41 are also rigidly connected by means of two connecting rods 44, both housings being mounted on one carriage 45, displacement of the complete driving unit to the individual gears being effected by means of a lever 46, which, with each gear position, engages in a given stop 47. A large counter friction gear 48 is fixed on a hollow lathe spindle 49. Gear change may take place during shut-down or in operation.

The adjustment range in the driving unit for friction gear and belt drive whilst using two proportional application pressure depends upon a known control angle $g$ (FIG. 8) which e.g. for the matching of friction wheels rubber on steel in accordance with experience amounts to 35°–38° corresponding to a coefficient of friction of 0.7–0.781. In this region the transmission ratio may be changed; according to the selection of the eccentricity $e$ there are 100% or ±50%. The control angle $g$ is formed by the connecting line of both wheel centres of wheels 24 and 50 and the eccentric pivotal point E and the point of contact A of the two wheels 24 and 50. The conditions shown in FIG. 8 are readily evident from a mathematical example. The friction wheel 50, point of operation O, having a diameter of 95 mm. and the eccentricity $e$ of 37.2 mm. result in $$\tan g = \frac{e}{a} = \frac{37.2}{47.5} = 0.781$$

this corresponds to an angle $g=38°$. A friction wheel 51, point of operation 1, having a diameter of 70 mm. with equal conditions results in a control angle $g=35°$. A friction wheel 52, operating point 2, having a diameter of 135 mm. results in a control angle of $g=34°$.

Hence in an adjusting range $v$ of a diameter from 70 to 135 mm. proportional pressure application prevails for every diameter. If the adjusting range $v$ is increased by the value $x$ for a friction wheel diameter of 45 mm., friction gear 53, then the control angle becomes excessively small, the pressure application force thereby excessively large, in order to avoid this the spring $F_x$ is arranged which acts against the excessive pressure application force. The adjusting range then becomes $V+x$. The diameter of the control disc may hence be varied from 45 to 135 mm., corresponding to a control range of 1:3. In types used heretofore it was necessary for the electric motor to be displaced on a frame, which is not so in the present case; the driving unit is not shifted when changing the friction gears. A continuous control may be obtained by the fact that the control wheel is laterally adjusted. This may also be effected automatically corresponding to the torque occurring, there also being obtained the known advantage that by means of the proportional pressure application more output can be transmitted.

In FIG. 9 there is illustrated an example for a belt drive unit having two pulleys 54 and 55 for 1-1:10 with constant axle spacing B, a control disc being in known manner laterally adjusted by means of a hand wheel, corresponding to the required transmission ratio. In this construction, too, the proportional pressure application has a favourable effect. The arrow C shows the direction of rotation and arrow D the reaction torque. The full line 57 constitutes the V-belt in an end position, the broken line 56 the belt in the other end position, whereby the transmission ratio 1:10 is obtained.

In FIG. 10 an example is illustrated wherein the driving unit for friction gear drives is installed in a housing 58 in which a counter friction wheel 59 is also mounted. The adjusting lever 17 causes the engagement and disengagement and on continued rotation the slowing down on the counter friction wheel 59 via an engaging bolt 60, a lever 61, a brake spanner 62, and an internal brake shoe 63. The cylindrical body 2, on the flange 15 on which the electrical motor is mounted, is rigidly connected with the second cylindrical body 64 by means of a stirrup 65. The same construction may also be used with the belt drive unit having a stepped pulley with constant belt length also having one or two V-belt pullies, especially as an adapter gearing for a multi-stage, gear wheel or friction gear. As a friction gear unit this drive may also be constructed with several gears (three as a stepped pulley), the cylindrical body 64 and the cylindrical body 2 being displaced with the electric motor 7 in corresponding long housing bores.

The internal brake shoe shown in FIG. 10 may also be used with the application of flat V-belts, as the pulleys with proportional application pressure may be arranged with contact proximity.

Figure 11:
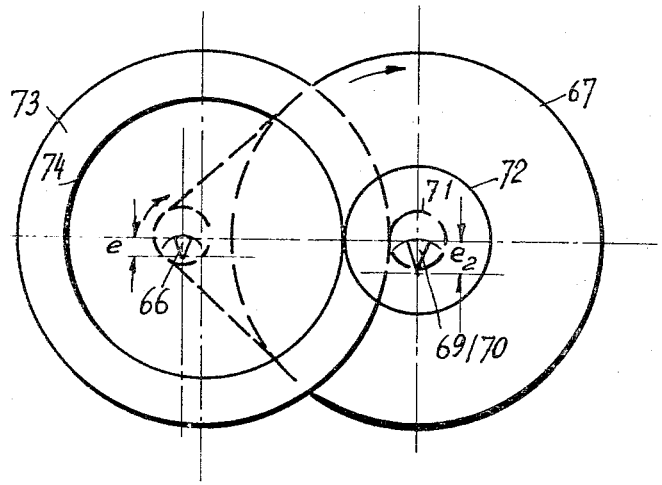
FIG. 11 is a schematic side view of a combined belt drive and friction drive unit.
Figure 12:
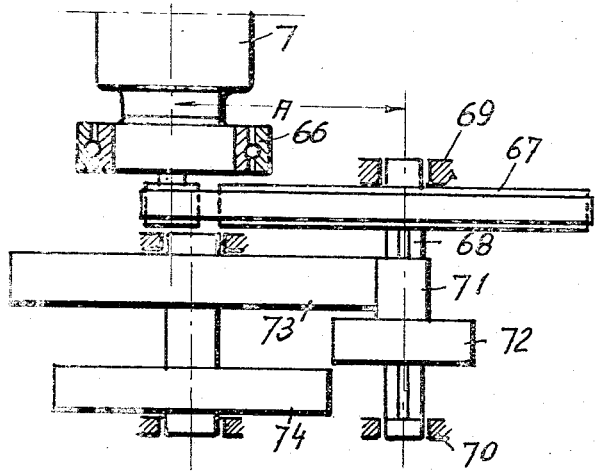
FIG. 12 is a plan view of the components shown in FIG. 11.

FIGS. 11 and 12 show an example of a combined arrangement of a belt drive and a friction gear unit for obtaining high transmission ratios up to 1:100 and more in a very constricted space. In a belt drive unit 66 the pulleys may be arranged in contact proximity owing to the proportional application pressure. A counter pulley 67 on an intermediate shaft 68 is mounted in two cylindrical bodies 69 and 70, which are rigidly interconnected, with an eccentricity of $e_2$ so as to be displaceable apart from the pulley 67. A stepped friction gear 71, 72 is mounted on the pinion or intermediate shaft 68. The proportional application pressure of the belt drive unit of the first transmission stage serves as an initiating pressure for the proportional pressure application for the friction gear pair 71 and 73 or a friction gear pair 72 and 74. In this way a three speed gear with high transmission from minimum to maximum outputs is obtained in a minimum of space.

In special cases, if technically required, two and more friction gear units may be used on a machine or on a counter friction gear, which are individually adapted to be switched on and off. The friction gear unit may without modification also be used as an internal friction gear, which, particularly in the case of subsequent attachment is, of advantage.

It is also possible for the combined use of a friction gear unit and belt drive on a restricted space to be configurated with advantage for high transmission ratios, namely for small and maximum outputs.

Compressed air motors or oil motors may optionally be used instead of electric motors.

Considerable advantages are presented by the use of multi-speed gears especially in all kinds of machine tools. In a milling machine e.g. many gears may be saved by means of the multi-speed gear, the change-over from one to the other being effected when stopped, idling and with full load, which is not possible in gear drives, at least not with simple means. In the case of milling machines an upper rapid motion speed for light metal machining and a lower slow motion speed for steel machining may also be obtained in the simplest manner. Considerable advantages are presented by the belt drive unit with the continuous speed control. Without varying the axle spacing of the driven machine and the driving unit a wide range speed control may be obtained, namely by means of manual adjustment of the control V-belt pulley on the driving unit or even fully automatically according to the occurring torque always by using the proportional application pressure which, as known brings the transmission of a higher output and permits closest contact proximity axle spacing, so that it is also possible to use closed housings. In multi-speed change gears by means of a handle, like in a tumbler yoke, a gear change from one gear to another may be effected with the machine stopped, idling or under load.

FIGS. 13 and 14 illustrate a friction gear unit. A brake shoe 75 is displaceably mounted on the bolt 19 which is fixed in the cylindrical body 2. A circuit breaker 76 for the electric motor is fixed to the housing 1. A plate 77 which is secured to the cylindrical body 2 supports a packing ring (not shown) between housing 1 and plate 77 for the ball bearing mounting of the shaft 3, the electric motor 7 being switched on and off by means of the plate 77 which runs up, with its beveled ledge 81 on the roller 82 of the switch 76. The unit is hence completely assembled with electric motor, brake and switch device and adjusting lever.

Since in the case of certain operating conditions the transmission ratio has to be varied by changing the driving friction wheels the possible friction wheel diameters are stated on the plate 77. For example if a small friction gear is changed for a larger one, then also the point of motor isolation varies; for this reason the plate 77 is provided with adjusting slots 83, and on the circumference the given position of the plate relative to zero inserted on the cylindrical body 2.

On the housing 1 are marked the permissible maximum outputs and the corresponding speeds; this shows for what outputs and transmission ratios the unit may be used, so that mistakes and overloads are avoided. For assembly, the unit is placed against the wheel 24 to be driven; herewith it is necessary for the assembly aid lines 78 and 78' to be aligned with the centre of the driven disc 24. This simple assembly does not require a skilled fitter.

Figure 15:
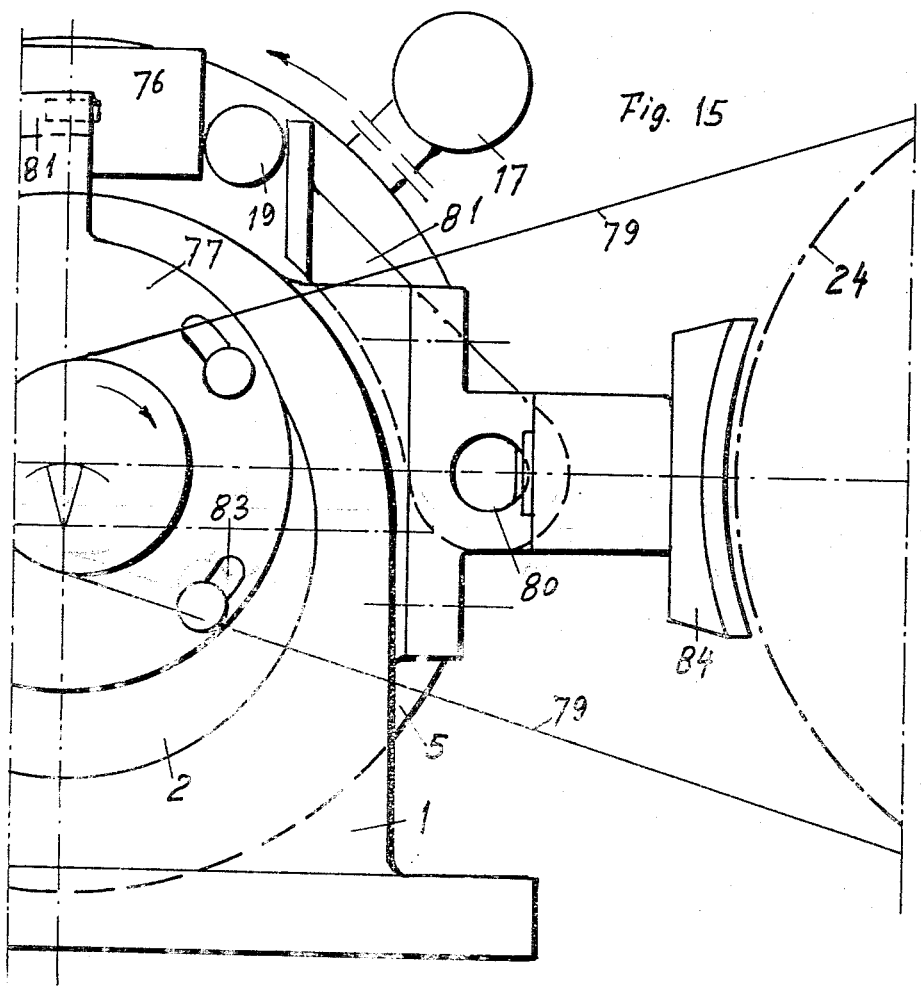
FIG. 15 is a side view of an alternative embodiment of a belt drive unit with external brake shoe.

In FIG. 15 there is shown a belt drive unit 1 with external brake shoe 84, which is arranged between the belt sections. The bolt 19 is fixed on the flange 5 of the cylindrical body 2. The adjusting lever 17 is displaced in the same direction as in the friction gear unit of FIG. 1 for disengaging, isolating the electric motor and slowing down the counter wheel 24. The bolt 19 presses against a lever 81 which turns a brake shaft 80 and presses the brake shoe 84 against the disc 24. It is also possible for the brake shoe 75 of the friction gear shown in FIG. 13 to be mounted on the brake shaft 80, which in that case is of eccentric construction, so that thereby the overall height becomes substantially lower, and hence the axle spacing smaller.

If in the case of a belt drive unit the belt is replaced by a chain then the control angle has to be selected larger since no application pressure is required, but only a smaller force for tensioning the chain. This eliminates the use of a chain tensioner which is required otherwise, or axle spacing variation eliminates re-tensioning the chain.

In the case of a V-belt drive, which has to be frequently re-tensioned, the unit has a good effect as a belt tensioning device.

The belt drive unit may also be operated with a steel band which has to operate under tension; herein the proportional application pressure has a very good effect, and it is possible in this case for the belt pulleys to be arranged with contact proximity, which in many instances has a just favourable spatial effect as in a gear drive.

FIGS. 13 and 15 are shown in scale 1:1 for an output of 1.1/1.5 p.s./H.P., FIG. 14 is drawn at a scale 1:2.5 From these figures it is evident that the units in their dimensions are very small in relationship with the electric motor and therefore are particularly well suited for installing in machine tools.

In these units e.g. the cylindrical body 2 may be exchanged for others having three different magnitudes of eccentricity $e=10$, 12, 16 and hence obtain a further range of the friction gear or belt pulley diameter from 18 to 53 mm., whilst maintaining the proportional application pressure, with constant unit spacing. The electric motor may also be replaced by an internal combustion engine or any other engine.

I claim:

1. A driving unit for producing a proportional application pressure, comprising a base, a housing for the unit, means for slidably displacing said housing on said base a cylindrical body rotatably mounted in said housing, flange means for securing said cylindrical body to an electric motor, driving component means including a shaft mounted for rotation lengthwise of said body, said shaft being offset from said body's axis, a driving member mounted on one end of said shaft, an adjusting lever means mounted on said cylindrical body for rotating said cylindrical body in a plane perpendicular to said shaft's axis.

2. A driving unit according to claim 1, wherein said housing is slidably mounted on said base, means for slidably mounting said housing, an abutment spaced from said housing, spring means interposed between said housing and said abutment for urging the housing into engagement with a driven member.

3. A driving unit according to claim 1, wherein a counterweight and an additional weight are mounted on the flange means of said cylindrical body.

4. A driving unit as claimed in claim 1, wherein said housing is adapted for mounting cylindrical bodies of different eccentricity.

5. A driving unit as claimed in claim 1, further provided with an adjusting lever for engaging and disengaging said driving component means with and from a driven member.

6. A driving unit as claimed in claim 5, wherein said adjusting lever is adapted to move said cylindrical body through a path 180° for changing the direction of said body and wherein there are provided switch means operable by said lever for switching off current and changing the direction of rotation during said lever's travel through said path.

7. A driving unit as claimed in claim 5, further provided with brake means actuable by said lever for retarding the rotational speed of a driven body.

8. A driving unit as claimed in claim 1, wherein said friction wheel is a stepped wheel, said unit being further provided with a carriage and means for slidably displacing said unit on said carriage, said means comprising a rack secured to said unit, a gear engageable with said rack and mounted in said carriage, a lever for rotating said gear, ball joint means securing said lever to said gear, a segment for guiding said lever in a vertical plane, a bell crank lever actuable by said lever and a cable pull connecting said bell crank lever and said stepped wheel for disengaging said wheel from a driven member.

9. A driving unit as claimed in claim 1, wherein said cylindrical bodies are displaceable axially in said housing said driving wheel being a stepped wheel.

10. A driving wheel unit as claimed in claim 1, further provided with a driven belt drive, connected in series with said friction wheel drive, a pinion shaft on which said wheel is axially displaceable.

11. A driving unit as claimed in claim 1, further provided with a bolt secured to said cylindrical body, a circuit breaker provided with a roller, secured to said housing, a plate secured to said cylindrical body, said plate having a ledge engageable with said roller for operating said circuit breaker.

12. A driving unit as claimed in claim 1, wherein diameter sizes and permissible maximum outputs and the speeds corresponding thereto are marked on said housing.

13. A driving unit as claimed in claim 1, further provided with an external brake shoe, a bolt secured to said flange means, said external brake shoe being arranged on said bolt, said lever means being operably connected to said brake shoe.

14. A driving unit as claimed in claim 1, wherein said driving members is lined with abrasion resistant rubber.

15. A driving unit adapted for use with a change gear machine, comprising a carriage, first and second rigidly connected housings spacedly and slideably mounted on said carriage, first and second cylindrical bodies rotatably mounted in said respective housings, a connecting rod rigidly connecting said bodies, lever means for displacing said housing on said carriage and stops for engaging said lever.

16. A driving unit comprising a housing, first and second cylindrical bodies mounted for rotation in said housing, a motor, a stirrup rigidly connecting said second cylindrical body with said motor, a driving friction wheel secured intermediate said bodies, a counter friction wheel mounted in said housing, and adjusting lever for engaging and disengaging said counter friction wheel with one of said bodies, said housing having a flange for securing said housing to said motor, an engaging bolt mounted in said flange, a lever, said lever being secured to said bolt, a brake spanner associated with said lever and an internal brake shoe actuable by said brake spanner.

References Cited by the Examiner

UNITED STATES PATENTS

| | | | |
|---|---|---|---|
| 1,275,751 | 8/1918 | Riopelle | 74—211 |
| 1,315,970 | 9/1919 | King et al. | 74—211 |
| 2,337,591 | 12/1943 | Coulson | 74—242.16 |
| 2,859,848 | 11/1958 | Bade | 74—211 X |
| 3,064,487 | 11/1962 | Warrick et al. | 74—242.16 |
| 3,211,014 | 10/1965 | Sanderson | 74—207 |

DAVID J. WILLIAMOWSKY, *Primary Examiner.*

L. H. GERIN, *Assistant Examiner.*